US006658112B1

(12) United States Patent
Barron et al.

(10) Patent No.: US 6,658,112 B1
(45) Date of Patent: Dec. 2, 2003

(54) VOICE DECODER AND METHOD FOR DETECTING CHANNEL ERRORS USING SPECTRAL ENERGY EVOLUTION

(75) Inventors: David L. Barron, Scottsdale, AZ (US); William Chunhung Yip, Phoenix, AZ (US); Paul Lopez Kennedy, Mesa, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/369,463

(22) Filed: Aug. 6, 1999

(51) Int. Cl.[7] .......................... H04L 9/00; G10L 19/04; G10L 19/08

(52) U.S. Cl. ....................... 380/275; 704/206; 704/219; 704/221; 380/276; 714/755; 375/229

(58) Field of Search ................................ 704/205, 206, 704/208, 209, 210, 219, 221, 223; 380/275, 276; 714/755; 375/229

(56) References Cited

U.S. PATENT DOCUMENTS

| | | | | | |
|---|---|---|---|---|---|
| 4,805,193 | A | | 2/1989 | McLaughlin et al. | 375/27 |
| 5,150,401 | A | | 9/1992 | Ashby, III et al. | 380/29 |
| 5,187,745 | A | * | 2/1993 | Yip et al. | 704/219 |
| 5,255,339 | A | | 10/1993 | Fette et al. | 395/2 |
| 5,414,796 | A | | 5/1995 | Jacobs et al. | 395/2.3 |
| 5,600,754 | A | | 2/1997 | Gardner et al. | 395/2.3 |
| 5,636,231 | A | | 6/1997 | Huang et al. | 371/37.1 |
| 5,657,420 | A | | 8/1997 | Jacobs et al. | 395/2.32 |
| 5,668,879 | A | * | 9/1997 | Ibaraki et al. | 380/41 |
| 5,754,974 | A | | 5/1998 | Griffin et al. | 704/206 |
| 5,774,837 | A | | 6/1998 | Yeldener et al. | 704/208 |
| 5,778,338 | A | | 7/1998 | Jacobs et al. | 704/223 |
| 6,205,130 | B1 | * | 3/2001 | DeJaco | 370/335 |
| 6,330,532 | B1 | * | 12/2001 | Manjunath et al. | 704/219 |

FOREIGN PATENT DOCUMENTS

| | | | |
|---|---|---|---|
| EP | 0523979 | 1/1993 | G10L/7/00 |
| WO | 9813941 | 4/1998 | H03M/13/00 |

OTHER PUBLICATIONS

"Method for Error Recovery of Line Spectral Frequencies", L.K. Ong et al., Electronics Letters, Stevenage, Herts., GB, vol. 29, No. 6, Mar. 18, 1993, pp. 510–512.

"Quality Enhancement of Coded and Corrupted Speeches in GSM Mobile Systems Using Residual Redundancy", T. Hindelang et al., IEEE International Conference on Acoustics, Speech, and Signal Processing, Los Alimitos, CA, Apr. 21, 1997, p. 259–262.

* cited by examiner

*Primary Examiner*—Gilberto Barrón
*Assistant Examiner*—A. Nobahar
(74) *Attorney, Agent, or Firm*—Hunton & Williams LLP

(57) ABSTRACT

A voice decoder detects channel errors and loss of cryptographic synchronization using the change in spectral energy between sequential frames. The change in energy between frames is determined between corresponding LSP's of said successive frames and summed together. A running average of the change in energy for a predetermined number of frames is maintained. Current voice frames are eliminated based on the difference between the change in energy associated with the current frame and the running average. Accordingly, offensive audio associated with such channel errors or cryptographic synchronization loss is eliminated.

20 Claims, 4 Drawing Sheets

40

VOICE DECODER AND METHOD FOR DETECTING CHANNEL ERRORS USING SPECTRAL ENERGY EVOLUTION

FIELD OF THE INVENTION

This invention relates in general to the field of digital receivers, in particular to the decoding of speech signals and more particularly to the improvement in audio quality by the detection of channel errors.

BACKGROUND OF THE INVENTION

With the emergence of new digital cellular-type telephones into the high volume commercial marketplace, voice compression algorithms are becoming commonplace. Due to the nature of voice coders and decoders, (i.e., vocoders) channel errors typically induce unusually offensive artifacts into a decoded speech signal. This is especially true when the spectral components of the speech signal becomes corrupted.

Line spectral pairs (LSPs) are typically used in modern vocoders because of their perceptual qualities and because LSPs are typically very well behaved. These characteristics allow for efficient coding and compression of the spectral content of a speech signal before its transmission across narrow band communication channels. The spectral content of voice signals is typically slowly evolving or changing. However, when a channel error corrupts an LSP parameter, it will usually cause dramatic and excessive changes in the spectral content of the signal. As a result, high-energy chirps or squawks are provided in the decoded signal which may be very offensive sounding.

In another example where digital voice information is encrypted, the receiver's loss of cryptographic synchronization results in improperly decrypted speech signals. The speech decoder in this case typically also provides offensive high-energy chirps and squawks until cryptographic synchronization is re-established.

Accordingly, what is needed are an apparatus and method for detecting offensive spectral errors. What is also needed are a method and apparatus for correcting offensive spectral errors. What is also needed are a method and apparatus that detects and corrects offensive spectral errors which result due to channel errors or the loss of crypto-synchronization.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a digital receiver and method for detecting channel errors using spectral energy evolution. The methods and apparatus of the present invention utilize the well-behaved nature of line spectral pairs (LSPs) to detect spectral errors, for example, due to channel errors, through the detection of changes in the LSP values that are decoded. In accordance with the preferred embodiments of the present invention, the rate of evolution of the LSP energies is used as an indicator of severe spectral deviations and may, for example, declare these to be channel errors which may be eliminated or smoothed over. In accordance with another preferred embodiment of the present invention, the loss of cryptographic synchronization is detected through the detection of dramatic changes in the LSP values that are decoded. Accordingly, when either a loss of cryptographic synchronization is detected, or channel errors are detected, offensive high-energy chirps and squawks can be reduced or eliminated from the audio portion of the receiver.

In accordance with the preferred embodiments of the present invention, a voice decoder detects channel errors and loss of cryptographic synchronization using the change in spectral energy between sequential frames. The change in energy between frames is determined between corresponding LSP's of said successive frames and summed together. A running average of the change in energy for a predetermined number of frames is maintained. Current voice frames are eliminated based on the difference between the change in energy associated with the current frame and the running average. Accordingly, offensive audio associated with such channel errors or cryptographic synchronization loss is eliminated.

Figure 1:
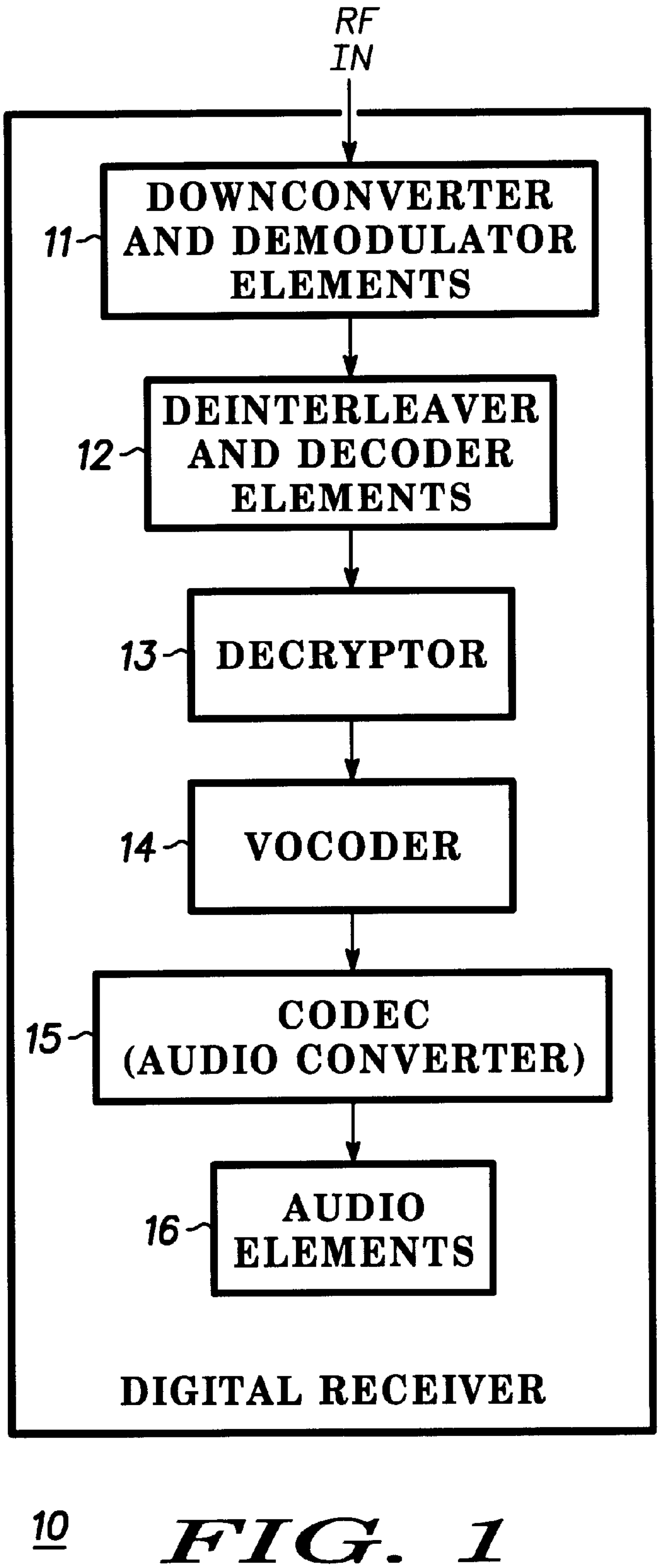
FIG. 1 illustrates a simplified functional block diagram of a digital receiver in accordance with a preferred embodiment of the present invention.

FIG. 1 illustrates a simplified functional block diagram of a digital receiver in accordance with a preferred embodiment of the present invention. Digital receiver 10 includes down-converter and demodulator elements 11 for receiving a digital signal modulated on a RF carrier. Down-converter portion down-converts the received signal to an IF signal and demodulator portion converts the IF signal to a digital signal comprised of frames of data or data packets. Typically, the data at the transmitter has been interleaved and coded (for example, convolutionally encoded). This data is provided to deinterleaver and decoder elements 12 which deinterleave and decode the digital data and provide data packets in the form of packetized voice frames. If this information was encrypted at the transmitter, decrypter 13 converts the encrypted data packets to decrypted data packets with an appropriate encryption key. Preferably, this is done on a frame-by-frame basis. The decrypted voice frames are provided by decrypter 13 to vocoder 14. Vocoder 14, among other things, synthesizes speech from the decrypted frames of voice and provides speech samples in digital form to codec 15. The speech samples provided by vocoder 14 are preferably pulse code modulated (PCM) signals. Codec 15 converts the digital speech samples to analog signals suitable for conversion to audio signals by audio elements 16 which may include, for example, a speaker.

In accordance with the preferred embodiment of the present invention, the transmitter provides typical error protection such as convolutional or trellis encoding, and interleaving of the data by spreading the data across several frames. The interleaver and decoder elements 12 perform the opposite functions of those of the transmitter, although interleaving and encoding are not necessary for the preferred embodiments of present invention.

Digital receiver 10, as shown, illustrates functional elements 11–16. These functional elements are preferably implemented through a combination of hardware and software elements and are not necessarily discrete or separable hardware elements. For example, a combination of any of the functional elements may be implemented with, for example, a digital signal processor (DSP).

Although a bus is shown in FIG. 1 as coupling elements 41 through 45, other means of transferring data are also suitable for use with the preferred embodiments of the present invention.

Figure 2:
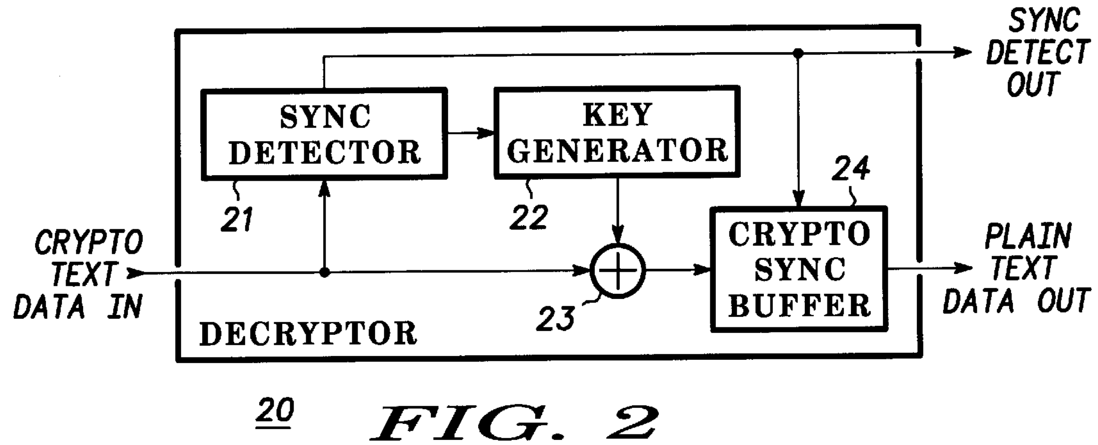
FIG. 2 illustrates a simplified functional block diagram of a decryptor in accordance with a preferred embodiment of the present invention.

FIG. 2 illustrates a simplified functional block diagram of a decryptor in accordance with a preferred embodiment of the present invention. Decryptor 20 of FIG. 2 is functionally suitable for use for element 13 (FIG. 1). Decryptor 20 receives frames of digital information and performs an exclusive "OR" (XOR) operation between the frames of data and a sequence of keys generated by key generator 22. The exclusive "OR" operation is performed by element 23. Decryptor 20 includes a sync detector element 21 which looks for a crypto-sync management frame in the input data stream of decryptor 20. When the crypto-sync management frame is detected, sync detector 21 initializes key generator 22 which preferably updates the state of the key generator with information in the sync management frame. As a result, key generator 22 begins generating a sequence of keys using a predetermined algorithm which enables the decryption of data through the exclusive "OR" operation. Detector 20 may also include a crypto-sync buffer element 24 for replacing the received crypto-synchronization management frame with another frame. Crypto-sync buffer element 24 is an optional element and is used to prevent, among other things, the decoding of the crypto-sync management frame by vocoder 14 (FIG. 1) which may produce an offensive sound.

In the preferred embodiment of the present invention, crypto-sync management frames are transmitted on a regular basis in what is referred to as a "blank and burst" mode. Accordingly, cryptographic synchronization can be obtained on a regular basis. In the preferred embodiment of the present invention, a crypto-sync management frame is transmitted, for example, every ten frames or on the order of every 900 milliseconds. Transmitting crypto-sync management frames more often or less often is also suitable. Decrypter 20 may be implemented through a combination of hardware and software and is preferably comprised of digital signal processors.

Figure 3:
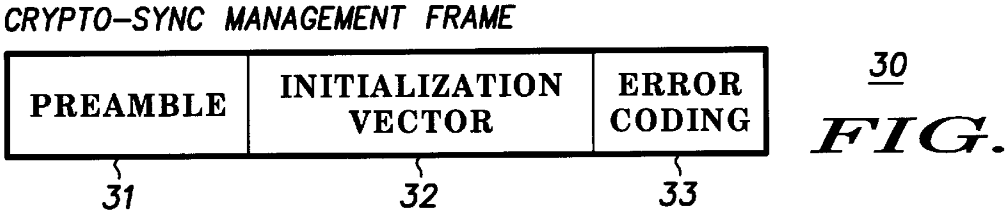
FIG. 3 illustrates a crypto-sync management frame suitable for use with the preferred embodiment of the present invention.

FIG. 3 illustrates a crypto-sync management frame suitable for use with the preferred embodiment of the present invention. Crypto-sync management frame 30 includes a preamble portion 31, an initialization vector 32 and an error coding portion 33. In accordance with the preferred embodiment of the present invention, preamble portion 31 comprises a predetermined sequence of bits that sync detector 21 looks for to determine whether or not a present frame is a crypto-sync management frame. Initialization vector 32 comprises data used by key generator 22 for initialization. Error coding portion 33 is used to determine if the packet has been corrupted and preferably is a cyclic redundancy check (CRC). Decryptor 20 (FIG. 2) preferably includes functional processing elements (not shown) for checking the error coding of the crypto-sync management frame.

Figure 4:
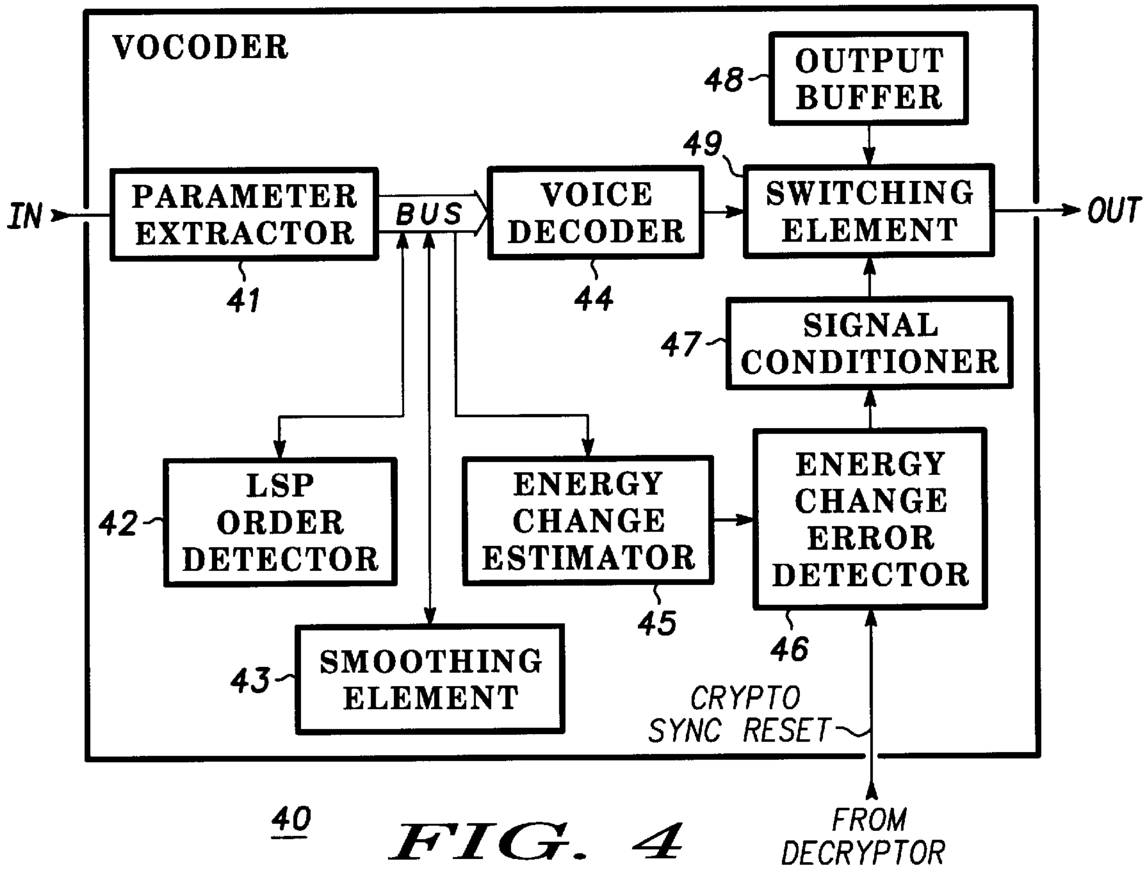
FIG. 4 is a simplified functional block diagram of a vocoder in accordance with a preferred embodiment of the present invention.

FIG. 4 is a simplified functional block diagram of a vocoder in accordance with a preferred embodiment of the present invention. Vocoder 40 is functionally suitable for use for vocoder 14 of digital receiver 10 (FIG. 1). Vocoder 40 includes parameter extractor 41 for extracting vocoder parameters from each frame of speech. Vocoder parameters comprise parametric data which include, for example, line spectral pairs (LSPs), frame energy parameters, pitch information parameters and residual information including codebook information. The vocoder parameters are preferably 16 bit words and each parameter fills one word. In accordance with the preferred embodiment of the present invention, ten LSPs are provided for each speech frame, although more or less LSPs may be extracted from each speech frame and used accordingly. Voice decoder 44 synthesizes a speech signal from the vocoder parameters and provides the synthesized speech to the output of the vocoder where it may be converted to audio signals. Vocoder 40 also comprises LSP order detector 42 which receives the LSPs from parameter extractor 41 and checks to see if the LSPs are in the proper order. For example, the order of the LSPs is based on their frequency and accordingly have a certain spacing which may be an equal spacing. When the spacing is not proper, LSP order detector may cause vocoder 40 to not decode that speech frame or alternatively, change the spacing of the LSPs to an equal spacing across the spectrum. This, for example, may require generation of new LSPs and may result in modification of the vocoder parameter word or words that comprise the LSPs.

In the preferred embodiments, vocoder 40 also comprises sub-frame interpolation element 43 which, among other things, generates a set of LSP's for each sub-frame in the vocoder frame by interpolation of the LSPs from the prior voice frame and the current voice frame. This has the effect of smoothing the LSPs across the frame. Sub-frame interpolation element 43 provides revised LSPs to voice decoder 44. Sub-frame interpolation element 43 is an optional element of vocoder 40 and is not required in the preferred embodiments of the present invention. It should be noted that in some embodiments, subsequent frame's LSPs may be transmitted by the transmitter as a delta from a prior frame. In this embodiment, there may be no need to check for frequency order because it is provided by the delta coding.

Vocoder 40 also comprises energy change estimator 45 which receives the LSPs from parameter extractor 41 and provides a value as its output for each frame referred to as a "change in energy per frame" value. The "change in energy per frame" value is estimated in accordance with the preferred embodiment of the present invention by taking the difference between corresponding LSPs of the prior frame and the current frame, squaring the difference values and summing the difference values all together. A high "change in energy per frame" may indicate that there is a high probability of a channel error or loss of synchronization. On the other hand, a low "change in energy per frame" may indicate that there is a low probability of such an error.

Vocoder 40 also comprises energy change error detector 46 which receives the "change in energy per frame" value from energy change estimator 45 and provides an output signal to vocoder 40, which preferably instructs vocoder 40 to refrain from providing the current frame. Energy change error detector 46 compares the "change in energy per frame" value of the current frame with a running average of the "change in energy per frame" values of prior frames to make this determination. When energy change error detector 46 determines that the current frame is erroneous, it provides the output signal to signal conditioner 47. Signal conditioner 47 is an optional element that may, for example, wait for a predetermined number of frames to be declared erroneous before instructing switching element 49 to refrain from providing a current frame or frames. In one embodiment of the present invention, switching element 49 switches in prior frames stored in output buffer 48. In another embodiment of the present invention, switching element 49 switches in frames with zero energy or frames of silence. This may be done through the use of output buffer 48.

Vocoder 40 is preferably implemented through a combination of hardware and software functional elements. The functional elements illustrated in FIG. 4 are preferably implemented through the use of digital signal processors.

Figure 5:
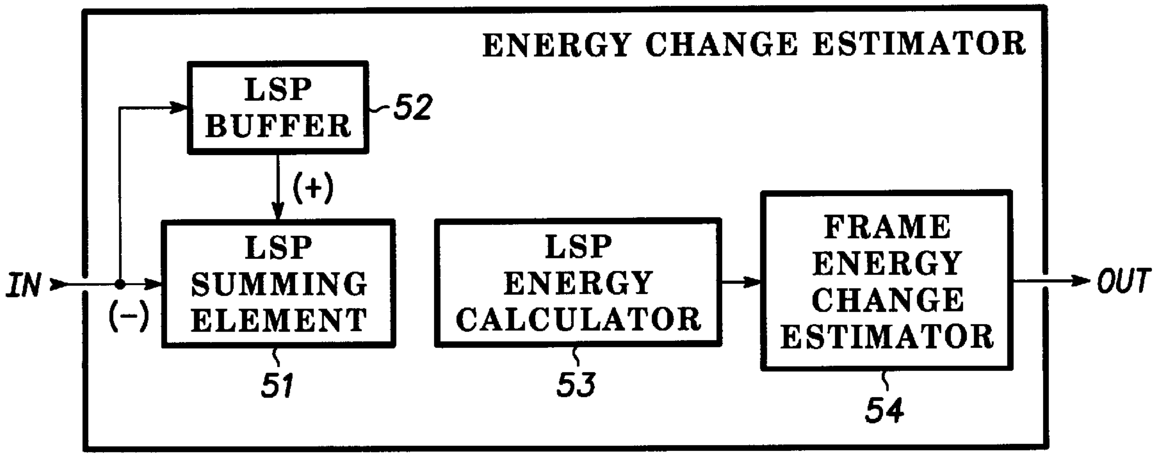
FIG. 5 illustrates a simplified functional block diagram of an energy change estimator in accordance with a preferred embodiment of the present invention.

FIG. 5 illustrates a simplified functional block diagram of an energy change estimator in accordance with a preferred embodiment of the present invention. Energy change estimator 50 is functionally suitable for implementing energy change estimator 45 of vocoder 40 (FIG. 4). Other ways of performing the function of energy change estimator 45 may also be suitable for the present invention. Energy change estimator 50 comprises LSP buffer 52 for storing the LSPs of prior frames. LSP summing element 51 performs a subtraction between corresponding LSPs of the prior frame and the current frame. In accordance with the preferred embodiment of the present invention where there are ten LSPs provided for each frame in a 16-bit word, LSP summing element 51 provides ten different values representing the energy difference between the corresponding LSPs. The LSP difference values are provided by LSP summing element 51 to LSP energy calculator 53. Energy calculator 53 performs an operation on each of the LSP difference values, preferably squaring each LSP difference value and providing each squared LSP difference value to frame energy change estimator 54. Frame energy change estimator 54 sums each of the squared LSP difference values and provides the "change in energy per frame" value output for each frame discussed above. Energy change estimator 50, although shown as comprised of separate functional elements 51 through 54, may be implemented within a digital signal processor.

Figure 6:
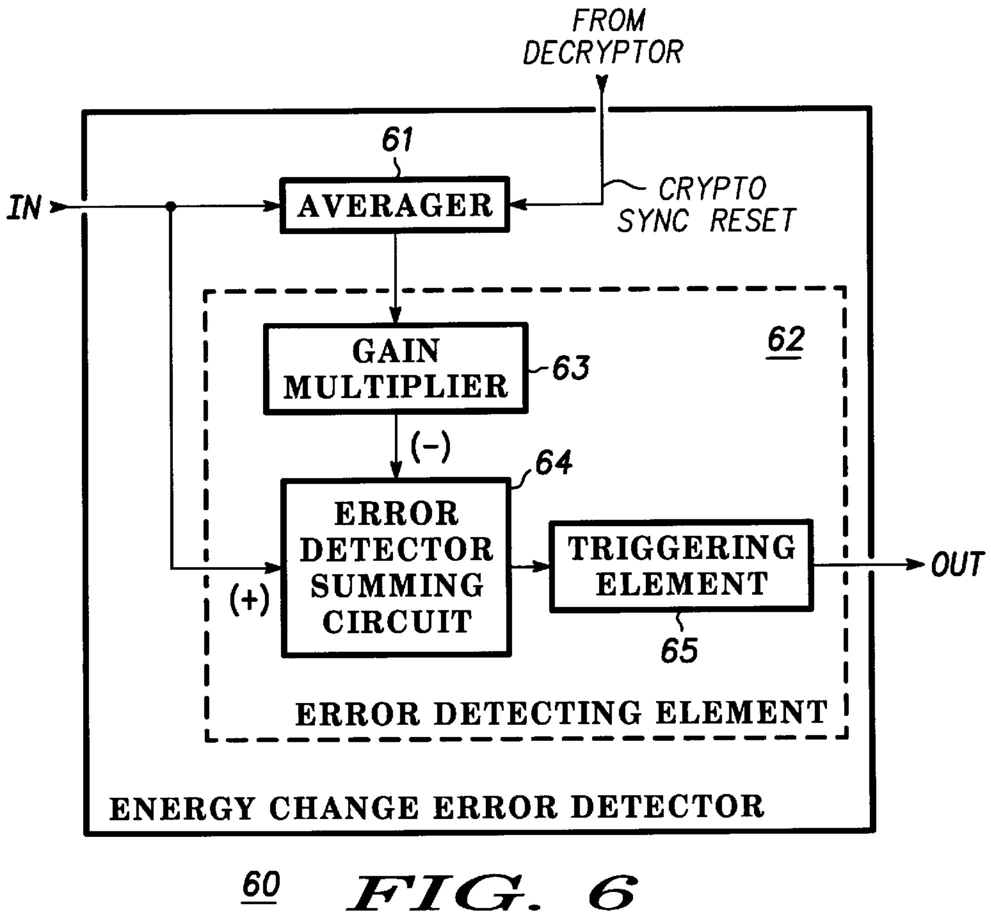
FIG. 6 illustrates a simplified functional block diagram of an energy change error detector in accordance with a preferred embodiment of the present invention.

FIG. 6 illustrates a simplified functional block diagram of an energy change error detector in accordance with a preferred embodiment of the present invention. Energy change error detector 60 is functionally suitable for implementing energy change energy detector 46 of vocoder 40 (FIG. 4). Energy change error detector 60 comprises averager 61 for calculating a running average of the "change in energy per frame" values received from energy change estimator 45. Averager 61 may be implemented functionally as a leaky integrator or mean integrator. In accordance with the preferred embodiment, the running average is determined based on an average of the "change in energy per frame" value of a previous predetermined number of frames. The number of frames used depends on the type of vocoder being used and channel conditions, among other things. Averaging over too many frames may result in the detection of too many errors while averaging over less number of frames may miss some errors.

Energy change error detector 60 also comprises energy detecting element 62. Energy detecting element 62 comprises an error detector summing element 64 which takes the difference between the running average provided by averager 61 and the "change in energy per frame" value for the current frame provided by energy change estimator 45. In accordance with the preferred embodiment, gain multiplier 63 adjusts the value of the running average signal for proper operation of element 64. A weighting function, for example, may be used. Error detecting element 62 also comprises triggering element 65 which triggers when the value provided by error detector summing element 64 is above a predetermined threshold. In the preferred embodiment, triggering element 65 comprises a Schmitt trigger. Energy change error detector 60 provides a trigger signal as its output which is used by vocoder 40 to determine whether or not the current frame should be provided to the audio portion of the receiver. Energy change error detector 60, although illustrated as separate functional elements, is preferably implemented within a digital signal processor.

Figure 7:
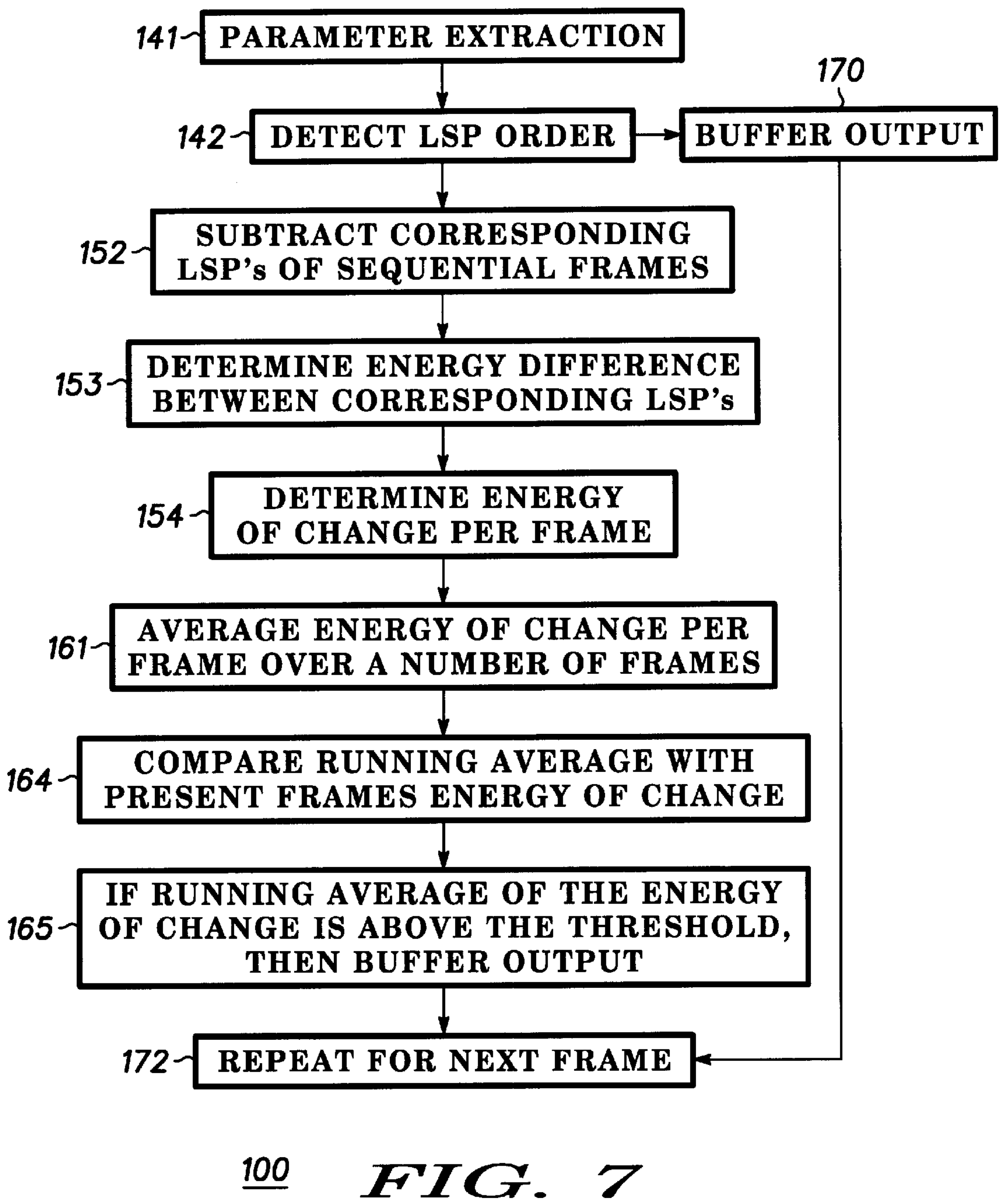
FIG. 7 illustrates a simplified flow chart of an error detection and correction process in accordance with a preferred embodiment of the present invention.

FIG. 7 illustrates a simplified flow chart of an error detection and correction process in accordance with a preferred embodiment of the present invention. Error detection and correction process 100 is suitable for implementation by vocoder 40 (FIG. 4). Process 100 may be implemented through a combination of hardware and software elements and is preferably implemented through the use of digital signal processors. In task 141, for each frame of voice information, a parameter extraction is performed which extracts parametric data from decrypted speech frames. The parameters extracted include line spectral pairs (LSPs). In task 142 the proper order of the LSPs is detected and when the LSPs are determined to be out of order or have an improper order, the LSPs may be modified or a buffered output ay be provided in task 170.

In task 152, corresponding LSPs of sequential frames are subtracted and a set of LSP difference values is determined. In the preferred embodiment which provides ten LSPs per frame, task 152 calculates ten LSP difference values. In task 153, the energy difference between the corresponding LSPs is determined. This may be done for example by squaring each of the LSP difference values. In task 154, a "change in energy per frame" is calculated. This is preferably done by summing all the squared LSP difference values. Accordingly, task 154 provides a single value per frame which represents the energy of change from frame to frame. In task 161, a running average is updated. The running average is the average energy of change per frame over a predetermined number of frames. For example, task 161 averages the "change in energy per frame" provided in task 154 over the past predetermined number of frames. Any number of frames may be used depending upon the specific embodiment of the present invention and specific implementations.

In task 164, the running average computed in task 161 is compared with the present frame's "change in energy per frame" value. This comparison is preferably a subtraction. In task 165, when the running average is above a predetermined threshold, a present frame is refrained from being provided through the audio portion of the receiver. Task 165 may also include providing a buffered output such as repeating prior frames or inserting silent frames at the output. In task 172, the steps of process 100 are repeated for the next frame. In accordance with the present invention, process 100 is an ongoing process and is performed for every frame processed by a vocoder.

In accordance with one embodiment of the present invention, the detection of an error (i.e., when the energy of change is above the threshold) may mean a loss of cryptographic synchronization. In this embodiment, silence frames are provided or prior frames are repeated until crypto-sync is obtained. In this embodiment of the present invention where crypto-sync management frames are transmitted every ten frames, the loss of crypto-synchronization would result for a maximum of 900 milliseconds. In this embodiment of the present invention, decrypter 20 (FIG. 2) provides a sync-detector output signal which sets the running average of the change in energy to zero upon detection of crypto-graphic sync. In this way, the prior unsynchronized frames do not affect the detection of errors in subsequent frames.

Thus, a digital receiver and method for detecting channel errors using spectral energy evolution has been described. The methods and apparatus utilize the well-behaved nature of line spectral pairs (LSPs) to detect spectral errors through the detection of changes in the decoded LSP values. The rate of evolution of the LSP energies is used as an indicator of severe spectral deviations and may, for example, declare these to be channel errors which may be eliminated or smoothed over. Additionally, the digital receiver and method of the present invention detects the loss of cryptographic synchronization through the detection of changes in the LSP values. Accordingly, when either a loss of cryptographic synchronization is detected, or channel errors are detected, offensive high-energy chirps and squawks are reduced or eliminated from the audio portion of the receiver.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a digital receiver, a method of detecting channel errors comprising the steps of:

computing line spectral pairs (LSPs) for a frame of packetized voice in a sequence of frames;

calculating a change in energy for said frame using the LSP's for said frame and corresponding LSPs of an adjacent frame in said sequence of frames;

computing a running average of said change in energy by averaging the change in energy over a predetermined number of sequential frames;

when the change in energy for said frame exceeds the running average by a predetermined amount, refraining from providing said frame to an audio portion of the receiver.

2. The method as claimed in claim 1 wherein the calculating step comprises the steps of:

subtracting each LSP for said frame from a corresponding LSP of a prior frame to determine a difference value for each LSP;

calculating an energy difference value for each LSP by squaring each difference value; and calculating said change in energy for said frame by summing each energy difference value.

3. The method as claimed in claim 1 wherein the calculating step calculates a change in energy for a predetermined number of prior frames, and wherein the computing the running average step comprises the steps of averaging said change in energy for said predetermined number of prior frames with said change in energy for a present frame.

4. The method as claimed in claim 3 wherein said digital receiver is operable for receiving encrypted digital voice data, and wherein the method further comprising the steps of:

initializing a key generator in response to detection of a cryptographic synchronization management frame to provide sequence of keys;

performing an exclusive "OR" (XOR) operation on said frame with a key of said sequence to produce a decrypted frame;

wherein the computing line spectral pairs step computes said LSPs for said decrypted frame, and wherein the method further comprises the step of resetting said running average in response to said detection of said cryptographic synchronization management frame.

5. The method as claimed in claim 3 wherein said digital receiver is operable for receiving encrypted digital voice data, and wherein the method further comprising the step of resetting said running average in response to detection of a cryptographic synchronization frame.

6. The method as claimed in claim 1 further comprising the steps of:

demodulating a received modulated carrier signal to provide frames of data; and de-interleaving the frames of encrypted data.

7. The method as claimed in claim 1 further comprising the steps of:

checking an order of said LSPs of the frame;

when the LSP's are out of order, refraining from providing said frame to an audio portion of the receiver.

8. The method as claimed in claim 7 further comprising the steps of:

subtracting each LSP for said frame from a corresponding LSP of a prior frame to determine a frequency difference for each LSP;

when one of the frequency differences exceed a predetermined threshold, performing a frequency smoothing operation on said corresponding LSP.

9. The method as claimed in claim 1 further comprising the step of voice decoding frames of packetized voice to produce digital speech samples; and converting the digital speech samples to audio voice signals.

10. The method as claimed in claim 1 wherein the refraining step further comprises the step of replacing the frame with a buffered frame.

11. The method as claimed in claim 1 wherein the refraining step further comprises the step of replacing the frame with said prior frame.

12. The method as claimed in claim 1 wherein the refraining step further comprises the step of replacing bits of said frame with zeroes.

13. A voice decoder for voice decoding voice frames to produce digital speech samples comprising:

a parameter extractor for providing parametric data for each voice frame, the parametric data comprising a set of line spectral pairs (LSPs) for each voice frame;

an energy change estimator for determining a change in energy between successive of said frames, the change in energy being a cumulative change in energy between corresponding LSP's of two sequential voice frames;

an energy change error detector for maintaining a running average of said change in energy for a predetermined number of said voice frames and providing a blanking signal based on a difference between said change in energy and said running average; and means for refraining from providing a current frame to an audio portion of the receiver in response to the blanking signal.

14. The voice decoder as claimed in claim 13 wherein the parameter extractor, the energy change estimator, the energy change error detector and means for refraining are implemented with a digital signal processor.

15. A receiver for receiving encrypted digital data comprising:

a demodulator for converting a received modulated carrier signal to frames of data;

a decryptor for decrypting the frames of data by performing an exclusive "OR" (XOR) operation on said frames with keys of a sequence to produce decrypted frames;

a voice decoder for voice decoding the decrypted frames and producing digital speech samples; and an audio converter for converting the digital speech samples to audio signals, wherein the voice decoder comprises:

a parameter extractor for providing parametric data for each decrypted frame, the parametric data comprising a set of line spectral pairs (LSPs) for each frame;

an energy change estimator for determining a change in energy between successive of said frames, the change in energy being a cumulative change in energy between corresponding LSP's of said successive frames;

an energy change error detector for maintaining a running average of said change in energy for a predetermined number of said frames and providing a blanking signal based on the difference between said change in energy and said running average; and a switching element for refraining from providing a current frame to an audio portion of the receiver in response to the blanking signal.

16. The receiver as claimed in claim 15 wherein the decryptor comprises:

a sync detector for detecting a cryptographic synchronization management frame;

a key generator for generating a sequence of cryptographic keys; and an exclusive "OR" element for performing an exclusive "OR" operation on the frames of data and said cryptographic keys, wherein the key generator is initialized by the sync detector with an initialization vector that is included in the cryptographic synchronization management frame, wherein the sync detector includes means for providing a sync detection signal to the energy change detector in response to detection of the cryptographic synchronization management frame, wherein the energy change detector further comprising means for initializing the running average in response to said sync detection signal.

17. The receiver as claimed in claim 15 wherein the energy change estimator comprises:

a LSP buffer for storing LSP's of a prior frame;

a LSP summing element for determining a difference between each of the LSPs of the prior frame and corresponding LSP's of a current frame;

an LSP energy calculator for squaring the difference between each of the LSPs of the prior frame and corresponding LSP's of the current frame and provide an energy value for each LSP; and a frame energy change estimator for combining the energy values to arrive at a change in energy value for the current frame.

18. The receiver as claimed in claim 17 wherein the energy change error detector comprises:

an averaging element for determining said running average;

a error detector summing element for determining said difference between said change in energy for the current frame and said running average; and a trigger element for providing a blanking signal based on the difference provided by the error detector summing element.

19. The receiver as claimed in claim 17 wherein the parameter extractor, the energy change estimator, the energy change error detector and the switching element are implemented with a digital signal processor.

20. The receiver as claimed in claim 15 further comprising a differential decoder for differentially decoding the voice frames and providing differentially decoded voice frames, said differentially decoded voice frames being detected for frequency offset associated with reception over a communication channel.

* * * * *